US006819806B1

(12) United States Patent
Kubota et al.

(10) Patent No.: US 6,819,806 B1
(45) Date of Patent: Nov. 16, 2004

(54) DOCUMENT PROCESSING APPARATUS AND STORAGE MEDIUM

(75) Inventors: Etsuko Kubota, Nagaoka (JP); Tadaatsu Nagumo, Nagaoka (JP); Miyuki Oodaira, Nagaoka (JP); Kazuya Fujisawa, Nagaoka (JP); Yoshiyuki Munemura, Nagaoka (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/518,139

(22) Filed: Mar. 3, 2000

(30) Foreign Application Priority Data

Aug. 25, 1999 (JP) ............................................ 11-238909

(51) Int. Cl.⁷ ............................ G06K 9/03; G06F 15/00
(52) U.S. Cl. ...................................... 382/309; 715/530
(58) Field of Search ........................ 382/309; 358/452; 345/733, 751; 715/530, 531; 709/204, 205

(56) References Cited

U.S. PATENT DOCUMENTS

| 4,667,248 A | * | 5/1987 | Kanno | ........................ 358/452 |
| 5,146,552 A | * | 9/1992 | Cassorla et al. | ............. 715/512 |
| 5,339,389 A | * | 8/1994 | Bates et al. | .................. 345/742 |
| 5,694,610 A | * | 12/1997 | Habib et al. | ................. 715/531 |
| 5,966,512 A | * | 10/1999 | Bates et al. | .................. 709/205 |
| 6,088,702 A | * | 7/2000 | Plantz et al. | ............. 707/103 R |

FOREIGN PATENT DOCUMENTS

| JP | 5-342326 | 12/1993 | ........... G06F/15/20 |
| JP | 6-295299 | 10/1994 | ........... G06F/15/20 |
| JP | 10-240724 | 9/1998 | ........... G06F/17/21 |

* cited by examiner

Primary Examiner—Leo Boudreau
Assistant Examiner—Tom Y. Lu
(74) Attorney, Agent, or Firm—Staas & Halsey LLP

(57) ABSTRACT

A document processing apparatus is provided with an output document generating section which extracts an arbitrary part of an input document and creates an output document including text information of the extracted part, and a writing section which writes information which makes it possible to specify the output document, in the extracted part of the input document.

19 Claims, 10 Drawing Sheets

F I G. 6
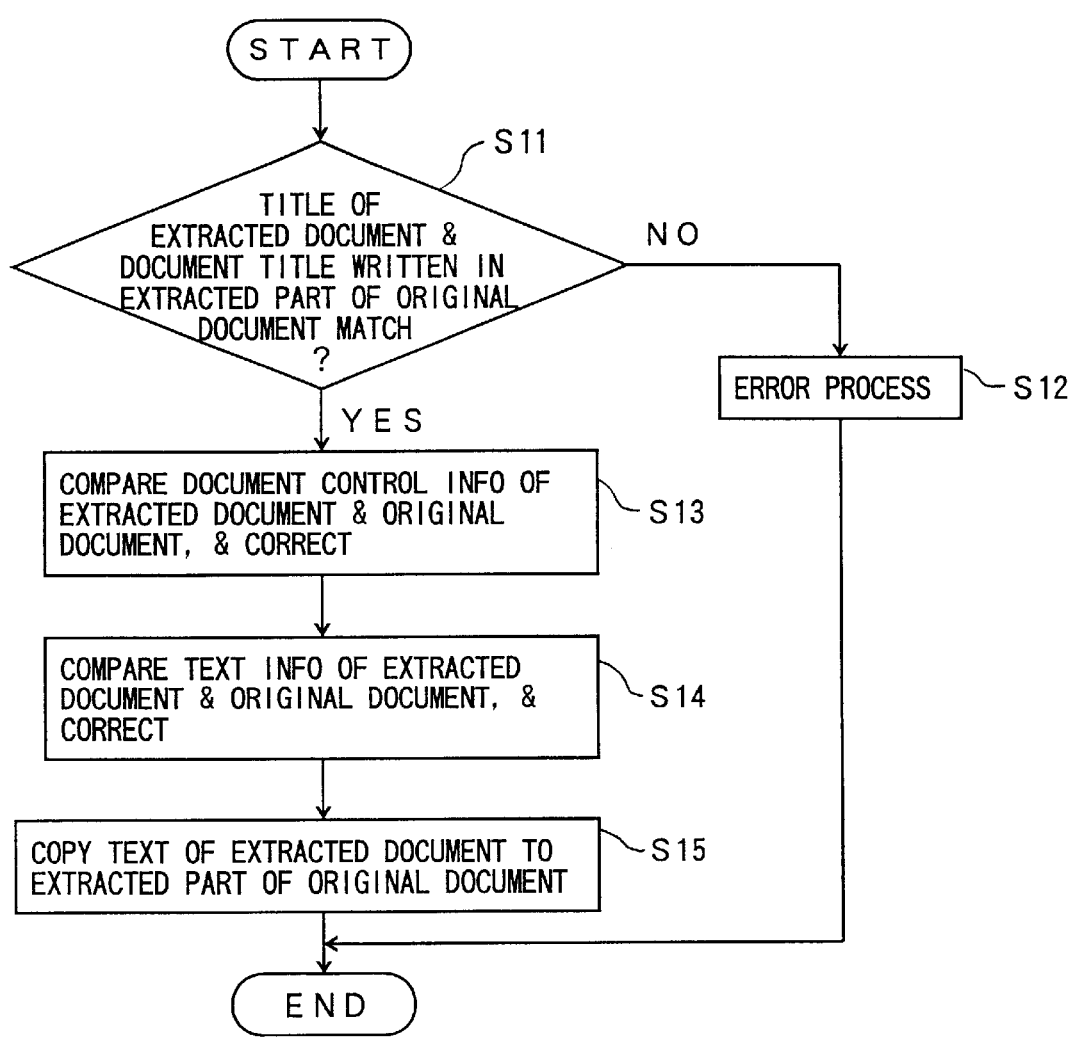

FIG. 8

DOCUMENT CONTROL INFO
LINE & DIGIT INFO
FONT INFO

TEXT INFO

EXTRACTED PART
(AFTER MODIFICATION)

DOCUMENT PROCESSING APPARATUS AND STORAGE MEDIUM

BACKGROUND OF THE INVENTION

1. Field of the Invention

The present invention generally relates to document processing apparatuses and storage mediums, and more particularly to a document processing apparatus having the functions of extracting an arbitrary part of an input document, modifying the extracted part and thereafter returning the modified part to the input document, and to a computer-readable storage medium which stores a program for causing a computer to realize such functions.

2. Description of the Related Art

Conventionally, complicated operations are required when a plurality of document creators (operators) treat one input document in a document processing apparatus. For example, it is necessary to update the document contents when the input document to be treated is not used, and to temporarily write the modifying contents to another document when no communication network is established and thereafter copy the modifying contents to the input document by a document manager.

In addition, when the document manager copies the modifying contents to the input document, it is necessary to carry out an operation to add information related to attribute, structure and the like with respect to the copied sentences or the like, because the modifying contents do not include information related to the attribute and structure of characters.

Therefore, conventionally, there are problems in that the operator cannot update the contents of the document at an arbitrary time, and in the case where the modifying contents are transferred to the document manager to be reflected to the input document, an error may be generated in the modifying contents if the information transfer to the document manager is insufficient or incomplete.

SUMMARY OF THE INVENTION

Accordingly, it is a general object of the present invention to provide a novel and useful document processing apparatus and computer-readable storage medium, in which the problems described above are eliminated.

Another and more specific object of the present invention is to provide a document processing apparatus and a computer-readable storage medium, which enable extraction of an arbitrary part of an input document and editing of the same document by a plurality of operators at the same time, and enable easy proofreading of the input document without requiring troublesome operations, by extracting the arbitrary part of the input document while maintaining the attribute, structure and the like of the arbitrary part.

Still another object of the present invention is to provide a document processing apparatus comprising an output document generating section which extracts an arbitrary part of an input document and creates an output document including text information of the extracted part, and a writing section which writes information which makes it possible to specify the output document, in the extracted part of the input document. According to the document processing apparatus of the present invention, it is possible to enable extraction of the arbitrary part of the input document and editing of the same document by a plurality of operators at the same time, and also enable easy proofreading of the input document without requiring troublesome operations, by extracting the arbitrary part of the input document while maintaining the attribute, structure and the like of the arbitrary part.

A further object of the present invention is to provide a computer-readable storage medium which stores a program for causing a computer to edit a document, comprising output document generating means for causing the computer to extract an arbitrary part of an input document and create an output document including text information of the extracted part, and writing means for causing the computer to write information which makes it possible to specify the output document, in the extracted part of the input document. According to the computer-readable storage medium of the present invention, it is possible to enable extraction of the arbitrary part of the input document and editing of the same document by a plurality of operators at the same time, and also enable easy proofreading of the input document without requiring troublesome operations, by extracting the arbitrary part of the input document while maintaining the attribute, structure and the like of the arbitrary part.

Other objects and further features of the present invention will be apparent from the following detailed description when read in conjunction with the accompanying drawings.

BRIEF DESCRIPTION OF THE DRAWINGS

FIG. 6 is a flow chart for explaining the process of the CPU when returning and connecting a modified document to the original input document;

FIG. 8 is a diagram for explaining the document data after returning the modified document;

DESCRIPTION OF THE PREFERRED EMBODIMENTS

Figure 1:
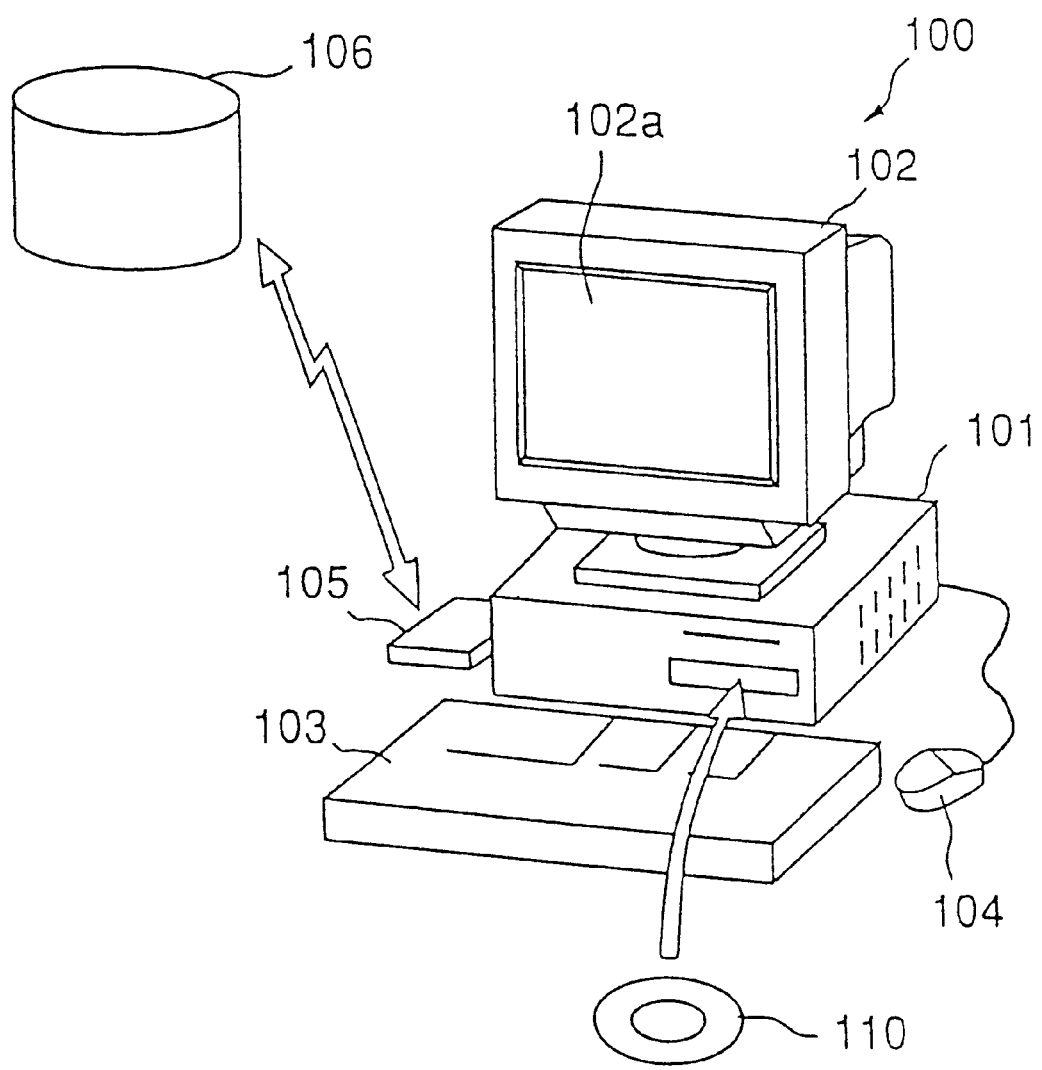
FIG. 1 is a perspective view showing an embodiment of a document processing apparatus according to the present invention.

FIG. 1 is a perspective view showing an embodiment of a document processing apparatus according to the present invention. In this embodiment, the present invention is applied to a computer system such as a personal computer, however, it is of course possible to similarly apply the present invention to work stations, word processors and the like.

A computer system 100 shown in FIG. 1 generally has a main body part 101 which includes a CPU, a disk drive and the like, a display 102 having a display screen 102 for displaying an image in response to an instruction from the main body 101, a keyboard 103 for inputting various information to the computer system 100, a mouse 104 for specifying an arbitrary position on the display screen 102a of the display 102, and a modem 105 for accessing an external database or the like and downloading a program and the like stored in another computer system.

Programs which are stored in a portable recording medium such as a disk 110 or, which are downloaded from a recording medium 106 of another computer system using a communication unit such as the modem 105, are input to the computer system 100 and compiled therein. The computer system 100 carries out processes which will be described later based on these programs.

An embodiment of a computer-readable storage medium according to the present invention is formed by a recording medium such as the disk 110 which stores the one or more programs described above. The recording medium is not limited to a portable recording medium such as IC card memories, floppy disks, magneto-optical disks, CD-ROMs and various kinds of semiconductor memory devices, and includes recording medium accessible by a computer system which is coupled via a communication unit or a communication means such as the modem 105 and a LAN.

Figure 2:
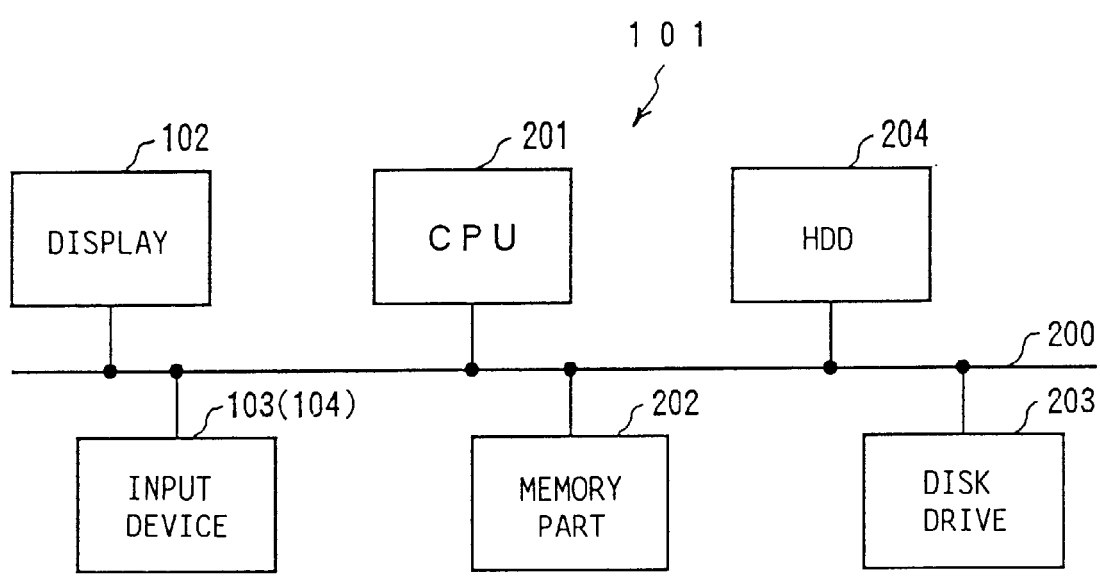
FIG. 2 is a system block diagram showing the construction of an important part of a main body and related parts of a computer system.

FIG. 2 is a system block diagram showing the construction of an important part of the main body 101 and related parts of the computer system 100. In FIG. 2, the main body 100 generally includes a CPU 201, a memory part 202 which includes a RAM, a ROM or the like, a disk drive 203 for driving the disk 110, and a hard disk drive (HDD) 204 which are coupled via a bus 200. In addition, the display 102 and the input devices such as the keyboard 103 and the mouse 104 are coupled to the CPU 201 via the bus 200 or, coupled directly to the CPU 201. For example, the memory part 202 forms a main storage, and the disk drive 203 and/or the hard disk drive 204 form an auxiliary storage.

The construction of the computer system 100 is of course not limited to that shown in FIGS. 1 and 2, and various known constructions may be used instead.

Figure 3:
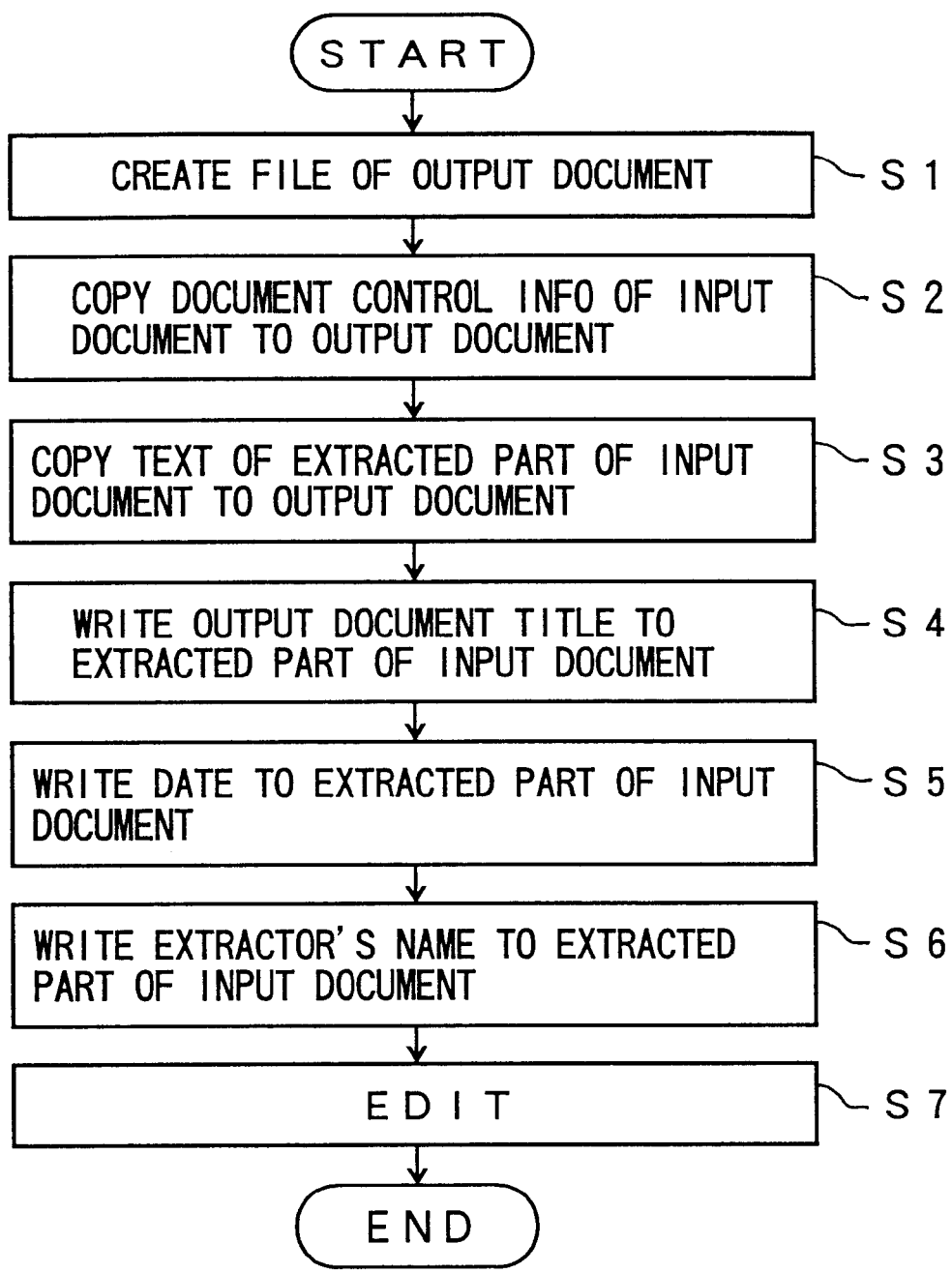
FIG. 3 is a flow chart for explaining the process of a CPU when extracting an arbitrary part of an input document.

First, a description will be given of the operation of extracting an arbitrary part of an input document in this embodiment, by referring to FIG. 3. FIG. 3 is a flow chart for explaining the process of the CPU 201 when extracting the arbitrary part of the input document.

Figure 4:
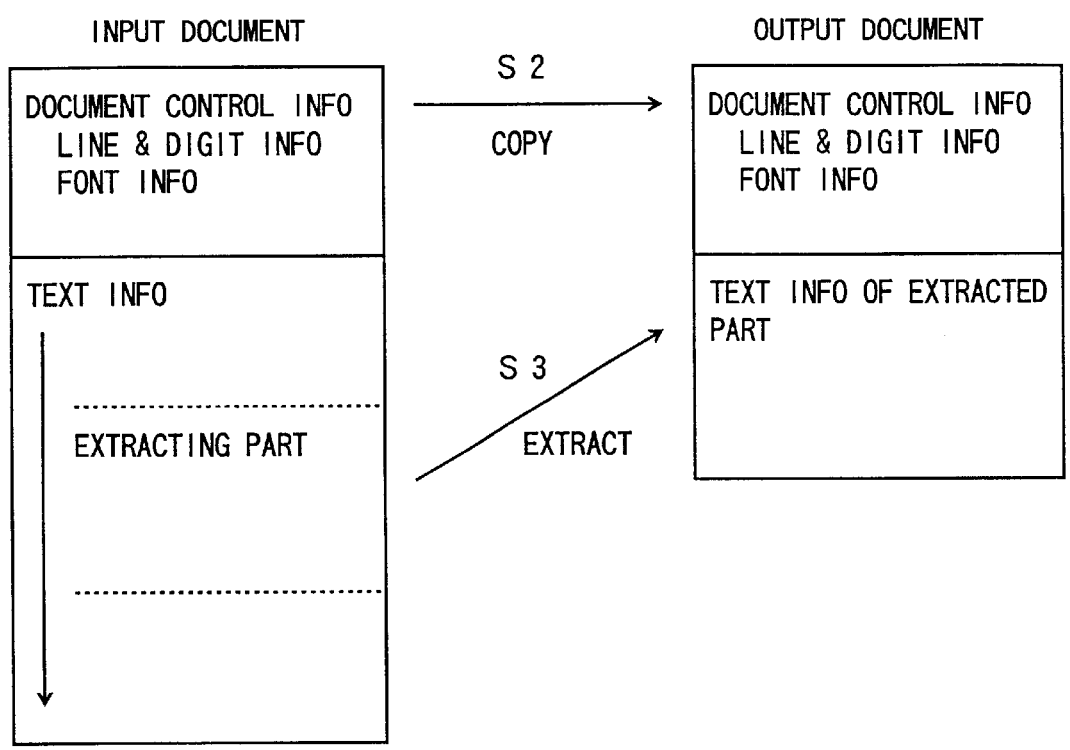
FIG. 4 is a diagram for explaining document data when extracting the arbitrary part of the input document.

In FIG. 3, a step S1 creates a file of an output document within the auxiliary storage. A file name of the output document may be specified by the operator from the input device or, generated automatically. A step S2 copies document control information of an input document within the main storage, to the output document as shown in FIG. 4. In this embodiment, the document control information includes line and digit information, and font information. The document control information is made up of information which is necessary to update the document, and includes information related to the structure and attribute such as the line and digit information, end-of-paragraph attribute, document attribute, font information and character attribute of the input document. A step S3 copies an arbitrary extracting part of the input document specified by the operator from the input device, that is, text (or body) information of a specified range, to the output document as shown in FIG. 4. As a result, the output document in which the range specified by the operator can be modified and updated, is created.

Figure 5:
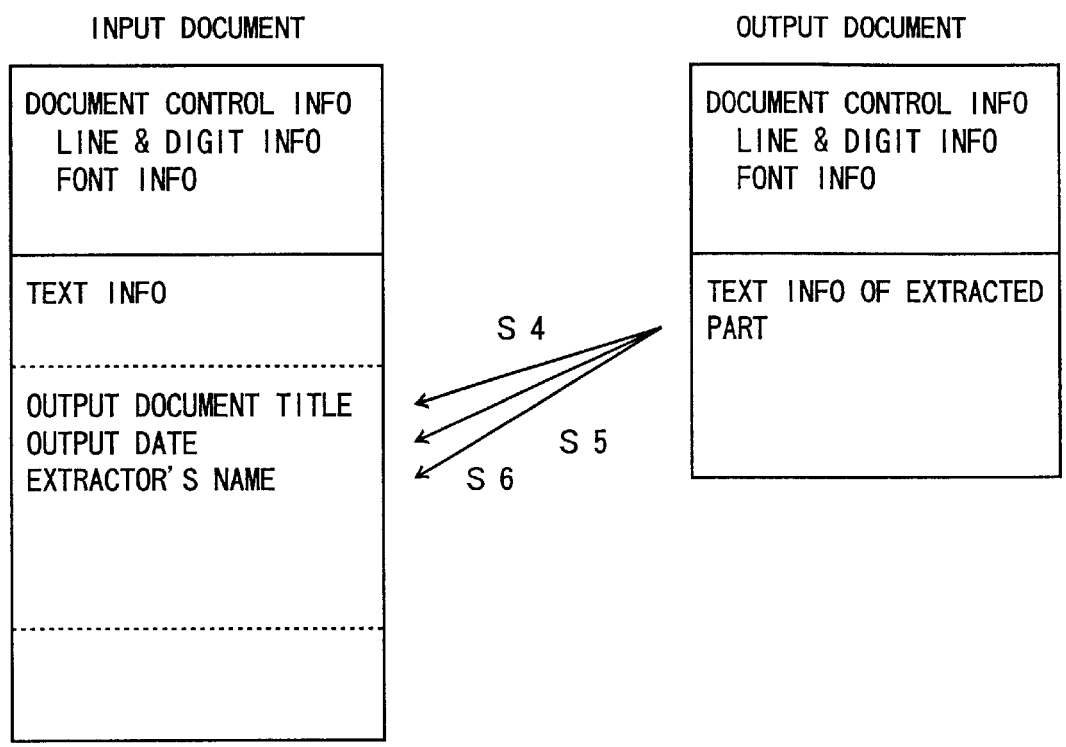
FIG. 5 is a diagram for explaining the document data after extracting the arbitrary part of the input document.

As shown in FIG. 5, a step S4 writes a title of the output document, that is, the file name, to the extracted part of the input document. In addition, a step S5 writes a date, time and the like of the output document to the extracted part of the input document, as shown in FIG. 5. Furthermore, as shown in FIG. 5, a step S6 writes to the extracted part of the input document the name of the extractor of the input document which is the same as the name of the creator of the output document, that is, the name of the operator, and the extracting process ends. Accordingly, information which makes it possible to specify the output document, such as the file name of the output document, the name of the extractor of the input document, and the date, time and the like when the extraction is made, is written to the extracted part of the input document. For this reason, it is possible to record the extraction of the input document and the copied destination of the extracted part.

Finally, a step S7 carries out an editing, such as modifying and updating the text information, with respect to the extracted part. This editing is made on the output document by a method similar to the conventional document editing method.

Next, a description will be given of the operation of returning and connecting the modified document back to the original document, by referring to FIG. 6. FIG. 6 is a flow chart for explaining the process of the CPU 201 when returning and connecting the modified document to the original input document.

The process of returning the document, shown in FIG. 6, is started when the operator specifies an original document and an extracted document from the input device. The original document refers to the input document described above, and the extracted document refers to the output document described above. A step S11 searches whether an extracted part exists in the original document, and decides whether or not the information of the extracted document written in the extracted part matches the information of the extracted document specified by the operator. More particularly, the step S11 decides whether or not the title of the output document written in the extracted part of the original document matches the title of the extracted document specified by the operator. If the decision result in the step S11 is NO, a step S12 carries out an error process and the process ends. For example, the step S12 displays an error message on the display 102, so as to notify the error to the operator.

Figure 7:
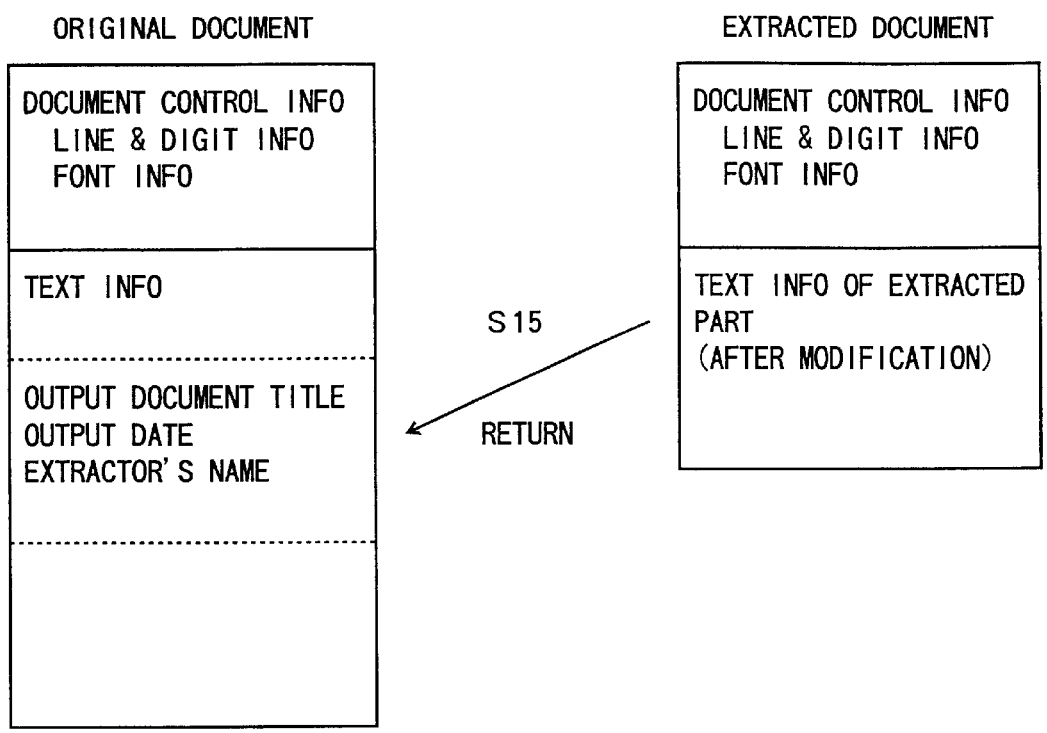
FIG. 7 is a diagram for explaining the document data when returning the modified document.

On the other hand, if the decision result in the step S11 is YES, a return and connect process made up of steps S13 through S15 is carried out. The step S13 compares the document control information of the original document and the document control information of the extracted document, and corrects the document control information of the extracted document so as not to make the operator feel uncomfortable or unnatural when the extracted document is returned to the original document. The step S14 compares the text information of the original document and the text information of the extracted document, and corrects the text information of the extracted document so as not to make the operator feel uncomfortable or unnatural when the extracted document is returned to the original document. Accordingly, depending on the number of lines, size and the like of the text of the extracted document, the region of the extracted part of the original document is enlarged or reduced. The step S15 copies the text information of the extracted document to the extracted part of the original document as shown in FIG. 7, and the process ends. Hence, the document which is extracted from the original document and modified, is returned to the original document and connected to the original document, so that the original document is modified as shown in FIG. 8.

According to this embodiment, when one input document is edited by a plurality of operators, it is possible to easily manage the document without forcing troublesome operations to be performed by the operators including the document manager, the document creator and the like.

Figure 9:
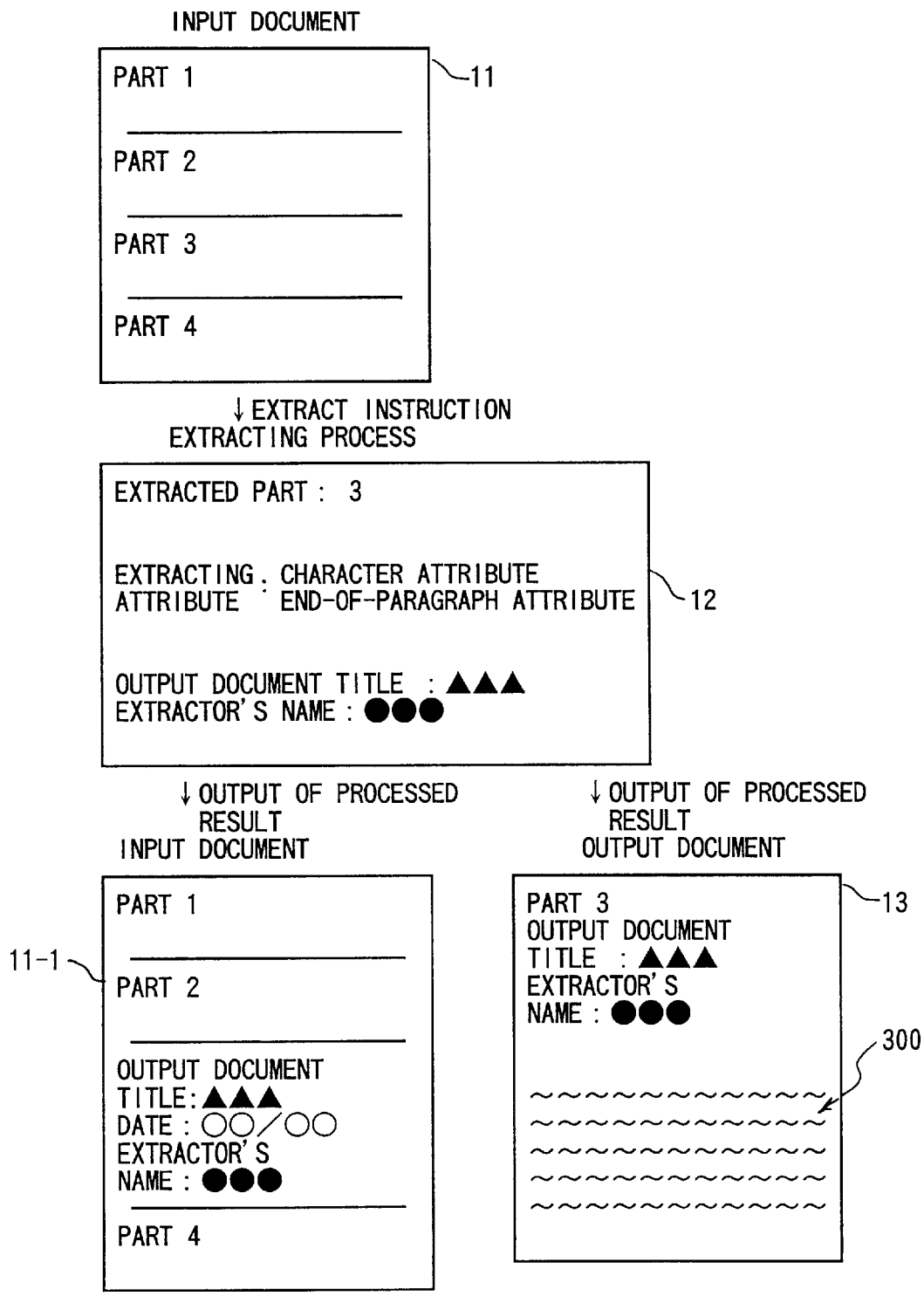
FIG. 9 is a diagram for explaining the process of extracting the arbitrary part of the input document.

Next, a description will be given of the process of extracting an arbitrary part of the input document and the process of returning a modified document to the original input document, for particular cases, by referring to FIGS. 9 and 10. FIG. 9 is a diagram for explaining the process of extracting the arbitrary part of the input document, and FIG. 10 is a diagram for explaining the process of returning the modified document to the original input document.

In FIG. 9, the text information of an input document 11 includes a part 1, a part 2, a part 3 and a part 4, for example. For example, when the operator specifies, as the extracting part, the part 3 within the text information of the input document 11, a display image 12 is displayed on the display 102, and necessary inputs are made by the operator from the input device. In this case, the specified extracted part is the part 3, and extracting attributes including the character attribute and the end-of-paragraph attribute are specified as the document control information of the input document 11. In addition, an output document title "▲▲▲" of the output document 13 and an extractor's name (operator's name) "●●●" which will be described later are also specified.

Accordingly, in addition to the extracting attributes described above, the extracting part 3, the output document title "▲▲▲", the extractor's name (operator's name) "●●●", and text information 300 of the extracting part are copied to the output document 13. Thereafter, the editing of the text information 300 of the extracting part 3 is made on the output document 13. As a result, the input document 11 assumes a state indicated by 11-1 in FIG. 9, and information such as the output document title "▲▲▲", a date "○○/○○" on which the extracting part 3 is extracted, and the extractor's name (operator's name) "●●●" are written in part of the extracting part 3 of the text information.

Figure 10:
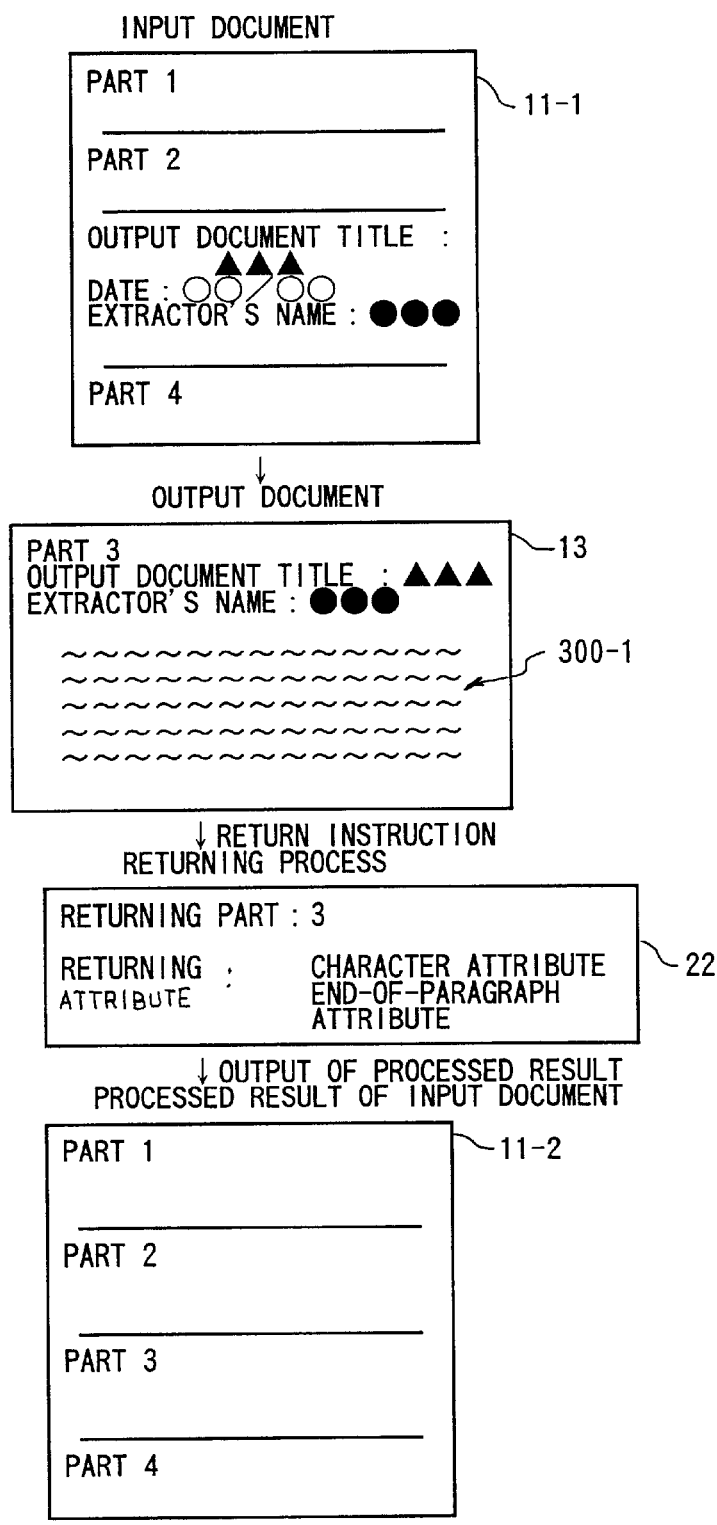
FIG. 10 is a diagram for explaining the process of returning the modified document to the original input document.

When the operator specifies the return of edited text information 300-1 of a returning part 3 to an input document 11-1 shown in FIG. 10 after editing the text information 300 of the extracting part 3 within the output document 13 shown in FIG. 9, an image 22 is displayed on the display 102, and necessary inputs are made by the operator from the input device. The text information 300 of the input document 11 and the test information 300-1 of the output document 13 are compared, and the text information 300-1 of the output document 13 is corrected if necessary, so as not to make the operator feel uncomfortable or unnatural when the output document 13 is returned to the input document 11-1. More particularly, the region of the extracting part 3 of the input document 11 is enlarged or reduced if necessary, based on return attributes (document control information) such as the character attribute and end-of-paragraph attribute which are specified by the operator, depending on the document control information such as the character attribute and the end-of-paragraph attribute of the text 300-1 of the output document 13. The text information 300-1 of the output document 13 is copied to the extracted part of an input document 11-2 as shown in FIG. 10, and the edited part 3 including the edited text information 300-1 is returned between the parts 2 and 4.

In the embodiment described above, it is of course possible to use at least one information as the document control information (return attribute), from among the information related to the structure and attribute of the document, such as the line and digit information, end-of-paragraph attribute, document attribute, font information and character attribute.

In addition, the information which makes it possible to specify the output document, such as the file name of the output document, the name of the extractor of the input document, and the date, time and the like which are recorded in the input document, does not have to be recorded in its entirety. It is sufficient to record the information which indicates that the extraction of the input document was made and which makes it possible to specify the copying destination of the extracted part.

Further, the present invention is not limited to these embodiments, but various variations and modifications may be made without departing from the scope of the present invention.

What is claimed is:

1. A document processing apparatus comprising:
   an output document generating section which extracts an arbitrary part of an input document and creates an output document including text information of the extracted part; and
   a writing section which writes specifying information about the output document, in the extracted part of the input document, the specifying information indicating extraction of the input document and a file name of the output document as a copying destination of the extracted arbitrary part of the input document.

2. The document processing apparatus as claimed in claim 1, which further comprises:
   an editing section which edits the text information within the output document.

3. The document processing apparatus as claimed in claim 2, which further comprises:
   a returning section which returns the text information within the output document to the extracted part of the input document.

4. The document processing apparatus as claimed in claim 3, wherein said output document generating section creates an output document which includes document control information of the extracted part and text information, and said returning section returns the text information within the output document to the extracted part of the input document based on the document control information.

5. The document processing apparatus as claimed in claim 4, wherein said returning section corrects the text information and the document control information based on document control information of the output document.

6. The document processing apparatus as claimed in claim 4, wherein the document control information is at least one information selected from a group of information related to structure and attribute of a document which are necessary to update the document, including line and digit information, end-of-paragraph attribute, document attribute, font information and character attribute.

7. A computer-readable storage medium which stores a program for causing a computer to edit a document according to a process, comprising:
   extracting an arbitrary part of an input document;
   creating an output document including text information of the extracted arbitrary part; and
   writing specifying information about the output document, in the extracted part of the input document, the specifying information indicating the extracting of the input document and a file name of the output document as a copying destination of the extracted arbitrary part of the input document.

8. The computer-readable storage medium as claimed in claim 7, which further comprises:

editing means for causing the computer to edit the text information within the output document.

9. The computer-readable storage medium as claimed in claim 8, which further comprises:

returning means for causing the computer to return the text information within the output document to the extracted part of the input document.

10. The computer-readable storage medium as claimed in claim 9, wherein said output document generating means causes the computer to create an output document which includes control information of the extracted part and text information, and said returning means causes the computer to return the text information within the output document to the extracted part of the input document based on the document control information.

11. The computer-readable storage medium as claimed in claim 10, wherein said returning means causes the computer to correct the text information and the document control information based on document control information of the output document.

12. The computer-readable storage medium as claimed in claim 10, wherein the document control information is at least one information selected from a group of information related to structure and attribute of a document which are necessary to update the document, including line and digit information, end-of-paragraph attribute, document attribute, font information and character attribute.

13. A method of processing a document, comprising:

extracting a part of an input document;

creating an output document from the extracted part;

generating identifying information about the output document; and recording the identifying information in the input document, the identifying information indicating the extracting of the input document and a file name of the output document as a copying destination of the extracted part of the input document.

14. The method of claim 13, further comprising:

editing text information within the output document.

15. The method of claim 14, further comprising:

returning the output document to the extracted part of the input document.

16. The method of claim 15, wherein returning the output document to the input document includes returning text information to the extracted part of the input document.

17. The method of claim 13, further comprising:

searching whether an extracted part of the input document exists;

wherein, if an extracted part of the input document does exist, comparing the identifying information of the extracted part in the output document to the identifying information in the input document, and if an extracted part of the input document does not exist, ending the process.

18. The method of claim 17, wherein if the compared identifying information of the output document and the input document matches, replacing the extracted part of the input document with the text information in the output document, and if the compared identifying information of the output document and the input document does not match, ending the process with an error message to the user.

19. The method of claim 13, further comprising:

removing the identifying information from the input document.

* * * * *